US009516088B2

(12) United States Patent
Zhong et al.

(10) Patent No.: US 9,516,088 B2
(45) Date of Patent: Dec. 6, 2016

(54) SYSTEMS AND METHODS TO CONSISTENTLY GENERATE WEB CONTENT

(75) Inventors: Tie Zhong, Palo Alto, CA (US); Raja Ramu, San Jose, CA (US)

(73) Assignee: eBay Inc., San Jose, CA (US)

( * ) Notice: Subject to any disclaimer, the term of this patent is extended or adjusted under 35 U.S.C. 154(b) by 443 days.

(21) Appl. No.: 13/597,935

(22) Filed: Aug. 29, 2012

(65) Prior Publication Data
US 2014/0067910 A1    Mar. 6, 2014

(51) Int. Cl.
G06F 17/30 (2006.01)
H04L 29/08 (2006.01)

(52) U.S. Cl.
CPC ......... *H04L 67/02* (2013.01); *G06F 17/30899* (2013.01); *H04L 67/34* (2013.01)

(58) Field of Classification Search
CPC .. G06F 17/2247; G06F 17/24; G06F 17/211; G06F 9/4443; G06F 17/3089; G06F 17/30896; G06F 17/30905
See application file for complete search history.

(56) References Cited

U.S. PATENT DOCUMENTS

| | | | |
|---|---|---|---|
| 7,389,517 B2 * | 6/2008 | Hon et al. | 719/330 |
| 7,721,225 B2 * | 5/2010 | Montroy et al. | 715/809 |
| 7,975,020 B1 * | 7/2011 | Green et al. | 709/217 |
| 8,150,939 B1 * | 4/2012 | Murray | 709/217 |
| 8,181,110 B2 * | 5/2012 | Worthington | 715/716 |
| 8,185,610 B2 * | 5/2012 | Goff et al. | 709/219 |
| 8,527,359 B1 * | 9/2013 | Varadhan et al. | 705/26.1 |
| 8,527,860 B1 * | 9/2013 | Colton et al. | 715/205 |
| 2005/0050164 A1 * | 3/2005 | Burd et al. | 709/217 |
| 2006/0080601 A1 * | 4/2006 | Weber et al. | 715/513 |
| 2006/0212842 A1 * | 9/2006 | Gossman et al. | 717/106 |
| 2008/0010590 A1 * | 1/2008 | Curtis et al. | 715/246 |
| 2008/0104025 A1 * | 5/2008 | Dharamshi et al. | 707/3 |
| 2008/0126944 A1 * | 5/2008 | Curtis et al. | 715/733 |
| 2008/0229217 A1 * | 9/2008 | Kembel et al. | 715/760 |
| 2009/0144753 A1 * | 6/2009 | Morris | 719/318 |
| 2009/0210781 A1 * | 8/2009 | Hagerott et al. | 715/234 |
| 2009/0282021 A1 * | 11/2009 | Bennett | 707/5 |
| 2009/0327934 A1 * | 12/2009 | Serpico et al. | 715/764 |

(Continued)

OTHER PUBLICATIONS

Christophe Coenraets, Tutorial: HTML Template with Mustache.js, Dec. 20, 2011, http://coenraets.org/blog/2011/12/tutorial-html-templates-with-mustache-js/.*

(Continued)

*Primary Examiner* — Wilson Tsui
(74) *Attorney, Agent, or Firm* — Schwegman, Lundberg & Woessner, P.A.

(57) ABSTRACT

Methods and systems to consistently generate web content are described. The system receives a request, at a server machine, for an interface, from a client machine and generates the interface. The interface includes a plurality of view components that includes a first view component. The system generates the first view component by utilizing a data binding engine that executes on the server machine to apply at least one interface element to a first position on the interface based on a presentation template and first view component information. The first view component is updated on the client machine utilizing a data binding engine that executes on the client machine to apply the at least one interface element to the first position on the interface based on the presentation template and the first view component information. The interface element is visibly displayed at the client machine.

20 Claims, 7 Drawing Sheets

(56) References Cited

U.S. PATENT DOCUMENTS

| | | | |
|---|---|---|---|
| 2010/0057847 A1* | 3/2010 | He | 709/203 |
| 2010/0192136 A1* | 7/2010 | Gopalakrishnan | 717/144 |
| 2010/0223322 A1* | 9/2010 | Mott et al. | 709/203 |
| 2010/0235765 A1* | 9/2010 | Worthington | 715/760 |
| 2010/0312858 A1* | 12/2010 | Mickens et al. | 709/219 |
| 2011/0055740 A1* | 3/2011 | Coleman et al. | 715/765 |
| 2011/0145364 A1* | 6/2011 | Joyce et al. | 709/219 |
| 2011/0197124 A1* | 8/2011 | Garaventa | 715/234 |
| 2011/0209049 A1* | 8/2011 | Ghosh et al. | 715/236 |
| 2011/0307833 A1* | 12/2011 | Dale et al. | 715/835 |
| 2012/0084638 A1* | 4/2012 | Calvin et al. | 715/234 |
| 2012/0102095 A1* | 4/2012 | Campbell et al. | 709/203 |
| 2012/0102386 A1* | 4/2012 | Campbell et al. | 715/229 |
| 2012/0110480 A1* | 5/2012 | Kravets | 715/760 |
| 2012/0216108 A1* | 8/2012 | Yambal et al. | 715/234 |
| 2012/0266088 A1* | 10/2012 | Finn et al. | 715/757 |
| 2012/0290919 A1* | 11/2012 | Melnyk et al. | 715/234 |
| 2012/0311424 A1* | 12/2012 | Bobykin et al. | 715/221 |
| 2013/0091415 A1* | 4/2013 | Stilling et al. | 715/234 |
| 2013/0187926 A1* | 7/2013 | Silverstein et al. | 345/440 |
| 2013/0226984 A1* | 8/2013 | Sunderrajan | 709/202 |
| 2014/0046980 A1* | 2/2014 | Kleinschmidt et al. | 707/793 |
| 2014/0281909 A1* | 9/2014 | Pinto et al. | 715/234 |

OTHER PUBLICATIONS

Allen Liu, How to hide, show or toggle your div with jQuery (p. 2, 30), Apr. 10, 2011, http://www.randomsnippets.com/2011/04/10/how-to-hide-show-or-toggle-your-div-with-jquery/#more-336.*

Christophe Coenraets, Mustache.js Samples (p. 1, 2), Dec. 20, 2011, http://coenraets.org/tutorials/mustache/.*

Christophe Coenraets, HTML source of "Mustache.js Samples", Dec. 20, 2011, html source of http://coenraets.org/tutorials/mustache/.*

Allen Liu, HTML source of the web page "How to hide, show or toggle your div with jQuery", Apr. 10, 2011, html source of http://www.randomsnippets.com/2011/04/10/how-to-hide-show-or-toggle-your-div-with-jquery/#more-336.*

Allen Liu, How to hide or show content based on links or urls via JavaScript/jQuery (http://www.randomsnippets.com/2011/04/10/how-to-hide-show-or-toggle-your-div-with-jquery/#more-336), Oct. 9, 2011.*

Christophe Coenraets, Tutorial: HTML Templates with Mustache.js, Dec. 20, 2012.*

* cited by examiner

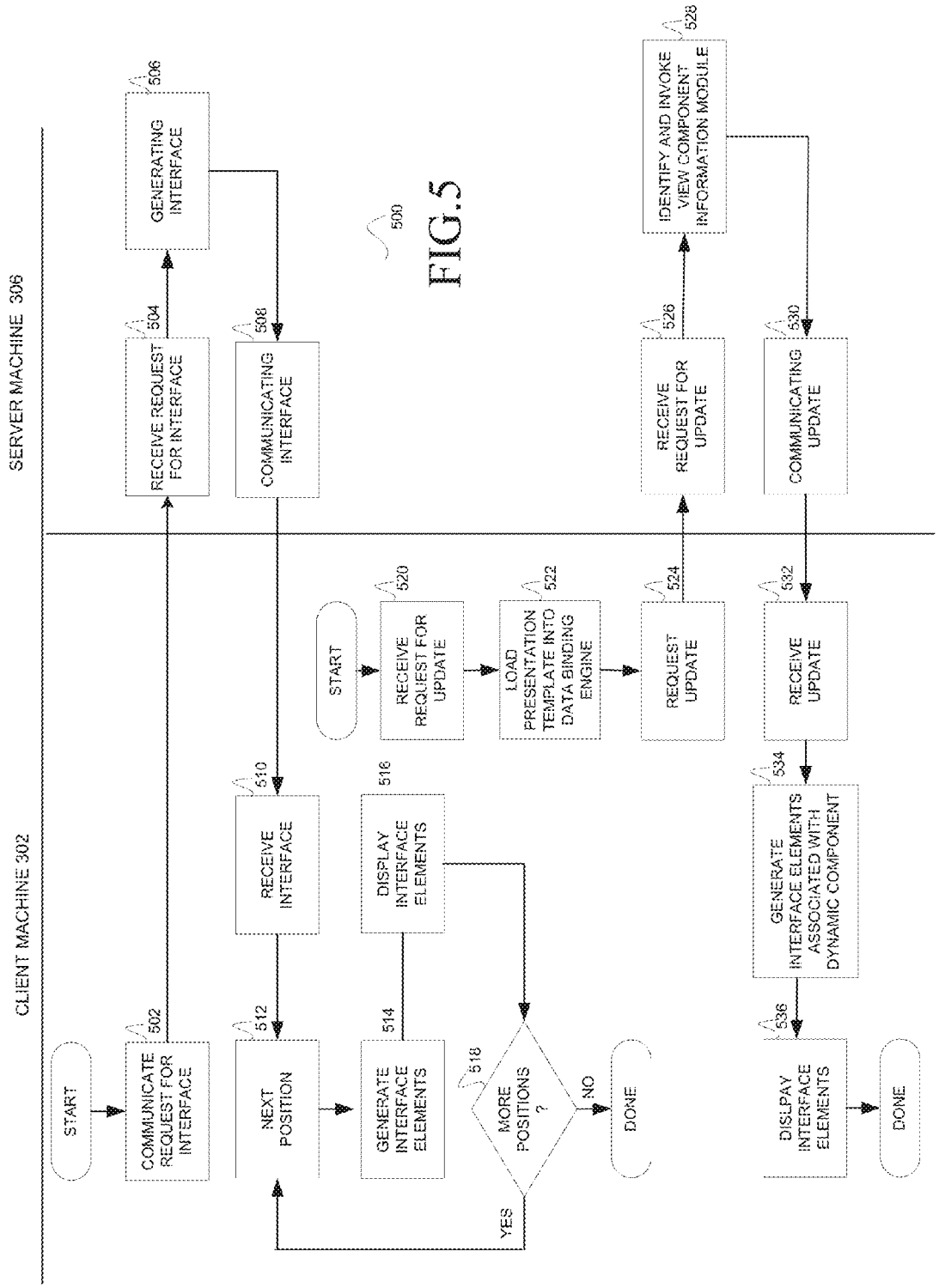

SYSTEMS AND METHODS TO CONSISTENTLY GENERATE WEB CONTENT

TECHNICAL FIELD

This disclosure relates to methods and systems supporting computing and data processing systems. More particularly, systems and methods to consistently generate web content are described.

RELATED ART

The Internet has become an indispensable tool to modern society. Web sites are ubiquitous and offer a plethora of web content. It is highly desirable that the web content be presented in a uniform and consistent manner.

BRIEF DESCRIPTION OF THE DRAWINGS

Embodiments are illustrated by way of example and not limitation in the figures of the accompanying drawings, in which:

FIG. 5 is a block diagram illustrating a method, according to an embodiment, to consistently generate web content;

DETAILED DESCRIPTION

In the following description, for purposes of explanation, numerous specific details are set forth in order to provide a thorough understanding of some example embodiments. It will be evident, however, to one of ordinary skill in the art that embodiments of the present invention may be practiced without these specific details.

As described further below, according to various example embodiments of the disclosed subject matter described and claimed herein, there is provided a systems and methods to consistently generate web content. Various embodiments are described below in connection with the figures provided herein.

Figure 1:
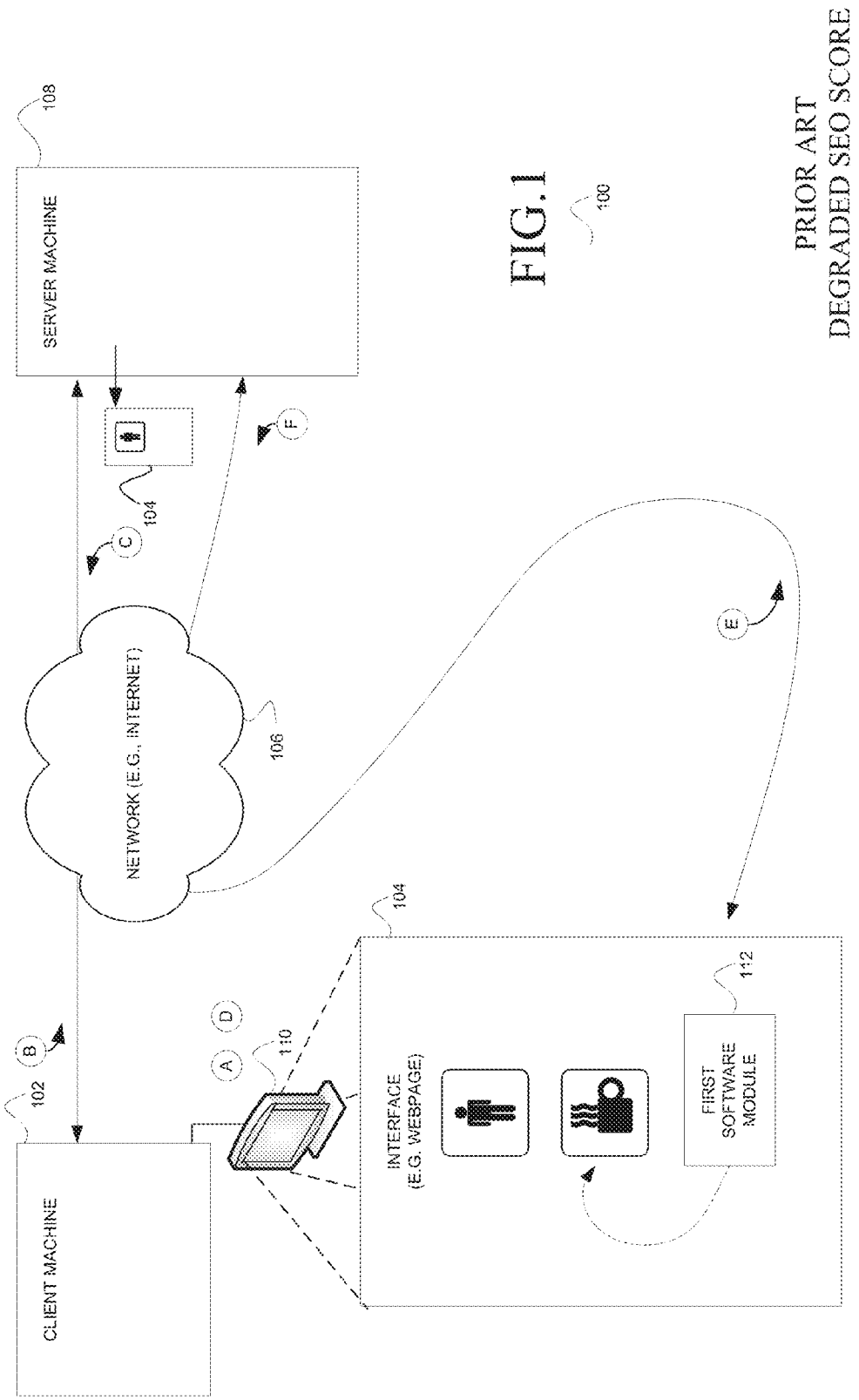
FIG. 1 is a block diagram illustrating a system, according to an embodiment, to generate web content that degrades a search engine optimization score.

FIG. 1 is a block diagram illustrating a system 100, according to an embodiment, to generate web content that degrades a search engine optimization score. The system 100 may include a client machine 102 that, at operation A, receives a request for an interface 104 (e.g., web page) from a user (not shown) and, at operation B, communicates the request over a network 106 (e.g., Internet) to a server machine 108 that, in turn, generates the interface 104 and, at operation C, communicates the interface 104 back over the network 106 to the client machine 102 where it is displayed on a monitor 110. The interface 104 may include interface elements (e.g., text, graphics, and/or images, etc.) that are applied to various positions on the interface 104 and displayed on the monitor 110. In the present example, the interface 104, as communicated from the server machine 108, includes an image of a man.

At operation D, at the client machine 102, a browser (not shown) may receive another request from the user (not shown) that is processed by a first software module 112 (e.g., JavaScript) that is included in the interface 104. At operation E, the client machine 102 may respond to the request by communicating a second request over the network 106 (e.g., Internet) to the server machine 108 which, in turn, responds by identifying or generating data and, at operation F, communicating the data back over the network 106 to the client machine 102 where the first software module 112 receives the data, generates interface elements based on the data, applies the interface elements to the interface 104 (e.g., coffee cup) and displays the interface elements on the monitor 110.

The above described system 100 is found in the prior art and associated with a deficiency. The deficiency manifests when a search engine web crawler that is executing at the client machine 102 requests the interface 104 (e.g., web page) from the server machine 108 to utilize the interface elements on the interface 104 to supplement the generation of a search index and for generating a search engine optimization score (SEO). An SEO score may be computed for the interface 104 by the web crawler and is based on the contents of the interface 104. A web page that is associated with a high SEO score is desirable because the higher score indicates that the web page is more likely to be returned in search results by the search engine and more likely to be returned in a prominent position in search results. Conversely, a web page with a low SEO score may not be returned in search results or returned in a position not likely to be viewed by the user. Accordingly, a strong bias is present in the user community to maximize SEO scores.

In the present example, the interface 104 may be associated with a degraded SEO score. The interface 104 may be associated with a degraded SEO score because the interface elements that are generated with the first software module 112 are not available to the search engine web crawler. The interface elements are not available to the search engine web crawler because they are applied to the interface 104 after the initial web page load. In summary, an SEO score for interface 104 may be degraded because the search engine web crawlers compute SEO scores without interface elements that are applied to the interface 104 in response to user interaction that is subsequent to the initial load of the web page.

Figure 2:
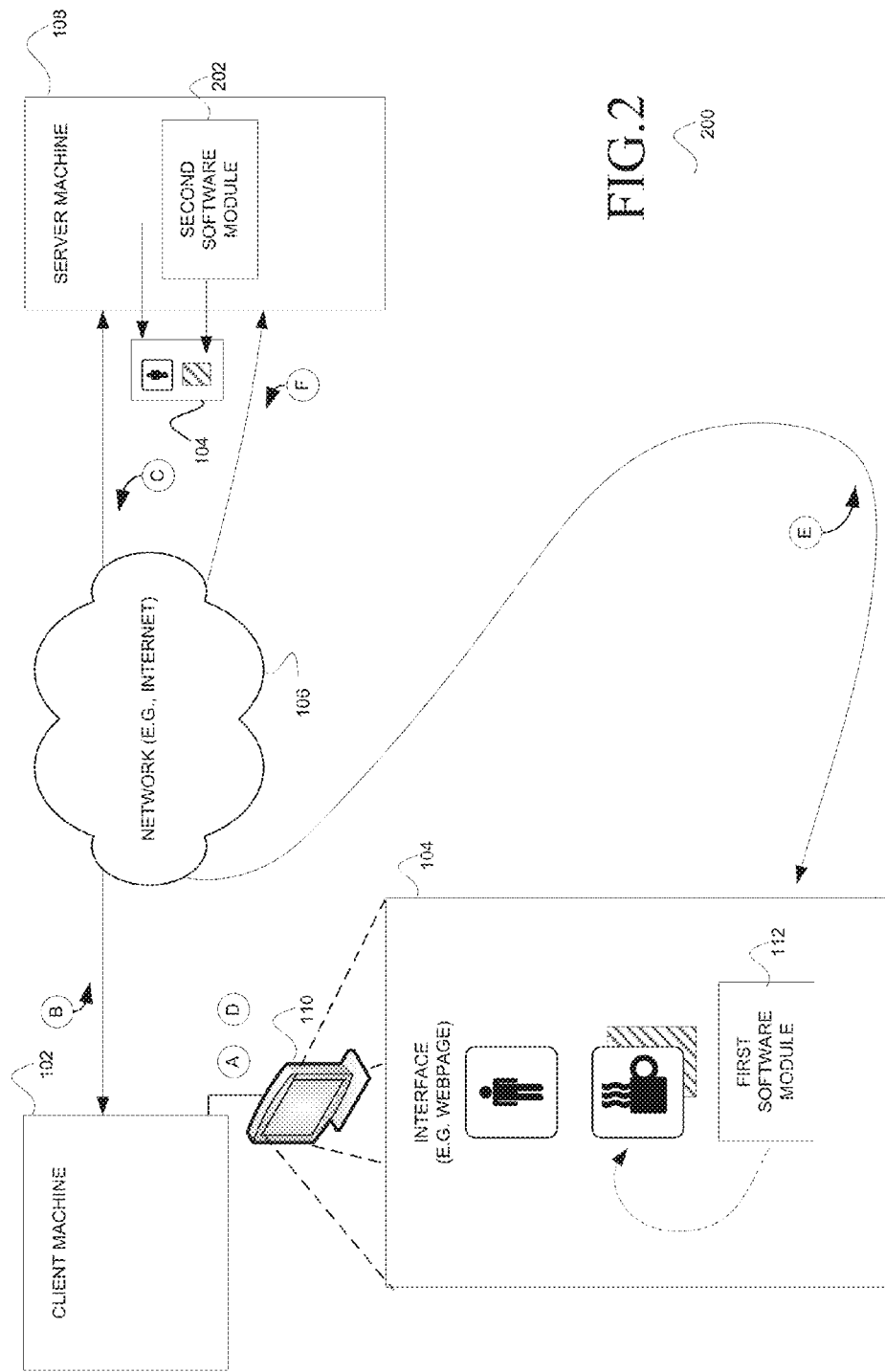
FIG. 2 is a block diagram illustrating a system, according to an embodiment, to remedy a degraded search engine optimization score.

FIG. 2 is a block diagram illustrating a system 200, according to an embodiment, to remedy a degraded SEO score. The system 200 corresponds to the system 100 shown in FIG. 1; accordingly, the same or similar references have been used to indicate the same or similar features unless otherwise indicated. The system 200 may remedy a degraded SEO score by generating an interface 104 that includes the interface elements (e.g., hashed rectangle representing the coffee cup) that otherwise would not be applied to the interface 104 unless requested by a user subsequent to the initial load of the web page. Accordingly, in the system 200, an SEO score for the interface 104 is not degraded because the search engine web crawlers compute SEO scores with interface elements (e.g., hashed rectangle) that are otherwise only applied to the interface 104 in response to subsequent user interaction. To this end the system 200 includes a second software module 202 (e.g., JavaScript) that may execute on the server machine 108 to generate the interface elements (e.g., hashed rectangle) that otherwise would not be applied to the interface 104 unless requested by user interaction subsequent to the initial load of the web page. To avoid confusing users who access the interface 104 via a browser, the interface elements that are being generated by the second software module 202 are hidden and therefore are not displayed on the monitor 110. The hashed rectangle indicates that the interface elements are hidden. Accordingly, SEO scores are improved by generating the interface 104 to include interface elements (e.g., hashed rectangle) that otherwise would not be applied to the interface 104 on the initial load of the web page.

The above prior art solution nevertheless introduces new problems. The above solution introduces problems because it utilizes two software modules to generate the same interface elements (e.g., coffee cup). For example, the second software module 202 is utilized by the server machine 108 to initially generate the interface element (e.g., hashed rectangle) and the first software module 112 is utilized by the client machine 102 to generate the same interface elements (e.g., coffee) in response to a user interaction. Twice generating the same interface elements with different software modules results at least in the following three problems. First, generation of the first software module 112 and the second software module 202 doubles engineering time and costs. Second, utilizing two software modules to generate the same interface elements may result in their inconsistency. Third, the development and maintenance of the first software module 112 is typically classified as a front-end task that is performed by one group of software engineers and the development and maintenance of the second software module 202 is typically classified as a back-end task that is performed by another group of software engineers. Lack of coordination between the different groups may further increase the likelihood of inconsistent web content.

Figure 3:
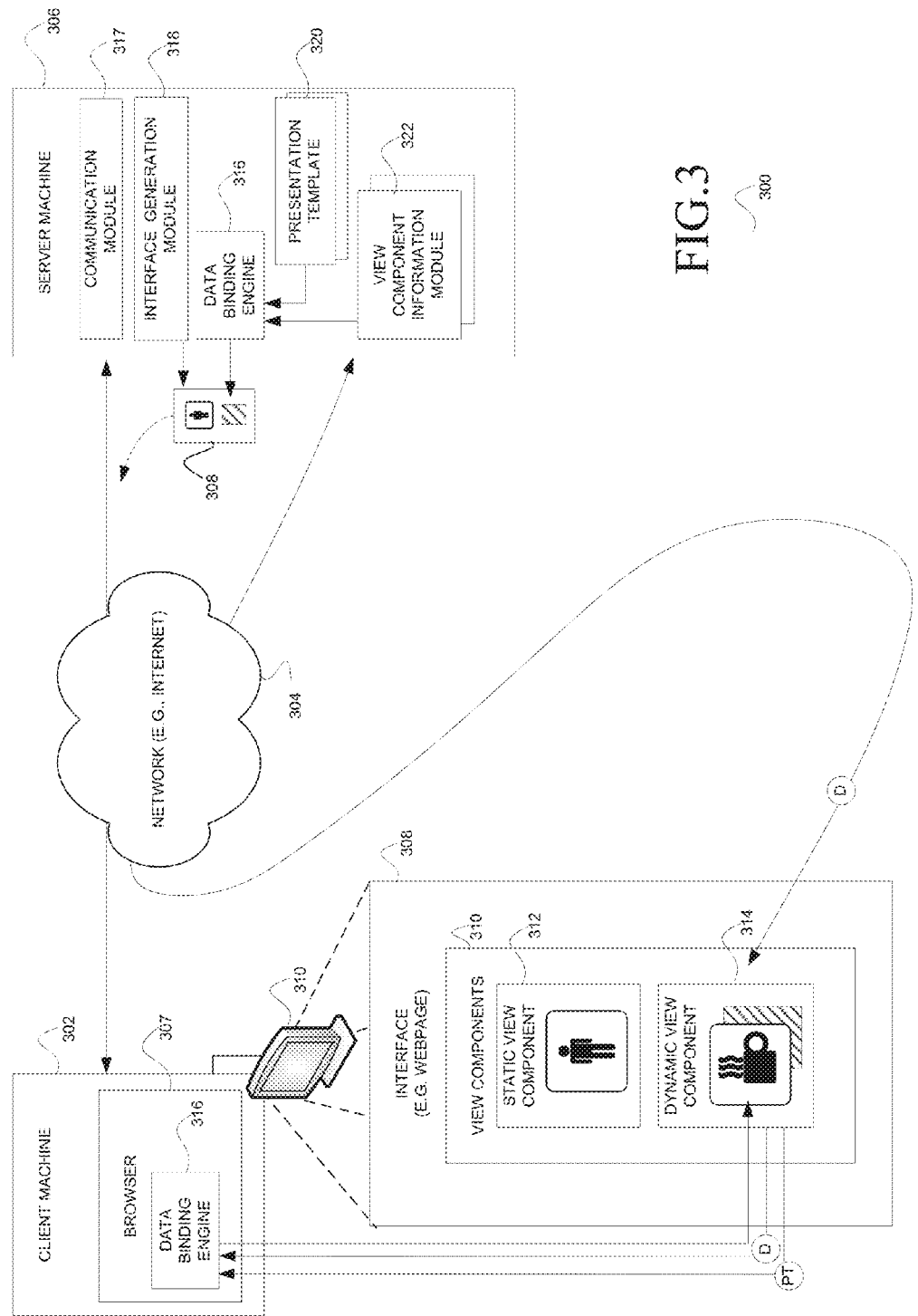
FIG. 3 is a block diagram illustrating a system, according to an embodiment, to consistently generate web content.

FIG. 3 is a block diagram illustrating a system 300, according to an embodiment, to consistently generate web content. The system 300 consistently generates the same interface elements for a particular position on an interface by utilizing a single presentation template that is associated with the position. The same presentation template is loaded into data binding engines both on the client machine and the server machine. The presentation template may include software that controls the update of the interface and style information that controls the appearance of the interface elements, as applied to the interface. Accordingly, the data binding engines on the client machine and the server machine execute the same software to receive data that is applied to the interface via the same style information that determines style, colour, and position on the interface to consistently include the interface elements on the interface.

The system 300 is now described in greater detail. The system 300 may include a client machine 302 that communicates over a network 304 (Internet) with a server machine 306 to request an interface 308 and to request an update to the interface 308 (e.g., web page). The interface 308 may include view components 310 that are respectively associated with interface elements and positions on the interface 308 to which the interface elements are applied. The interface elements may be applied to the interface 308 with a status of "HIDDEN" to suppress the display of the interface elements or with a status of "VISIBLE." The view components 310 may include static view components 312 that are not associated with an internal web page interaction with the user (e.g., an interaction with the user that causes an update to the interface 308 without reloading the entire interface 308), and dynamic view components 314 that are associated with an internal web page interaction with the user. The dynamic view components 314 may include a presentation template (not shown) that includes a view component module (not shown) and style information (not shown). The view component module and the style information may be loaded into a data binding engine 316. The view component module may be executed by the data binding engine 316 to interact with the user, request data in the form of view component information from the server machine 306, generate interface elements based on the data, and apply the interface elements to the interface 308. The style information may be utilized to control the location and appearance of the associated interface elements on the interface 308. This operation may be embodied as an asynchronous JavaScript and XML (AJAX) remote function call. AJAX is a group of interrelated web development techniques used on the client-side to create asynchronous web applications. In an AJAX embodiment, web applications may send data to, and retrieve data from, the server machine 306 (in the background) without interfering with the display and behavior of the existing interface 308 (e.g., web page). In one embodiment the data in the form of view component information may be retrieved using the XMLHttpRequest object, as understood by those skilled in the art. Notwithstanding the name, AJAX, the use of XML is not required. In one embodiment JavaScript Object Notation (JSON) may be utilized instead of XML. Further, requests for the data do not need to be asynchronous. AJAX is not a single technology, but a group of technologies. Hypertext Markup Language (HTML) and Cascading Style Sheets (CSS) may be used in combination to mark up and style the interface elements that are displayed on the interface 308 on the monitor 310 at the client machine 302. Further, the Document Object Model (DOM) may be accessed with JavaScript to dynamically display, and to allow the user to interact with, the information presented as understood by those skilled in the art. In one embodiment, JavaScript and the XMLHttpRequest object may be utilized to exchange data asynchronously between a browser 307 and the server machine 306 to avoid full interface 308 (e.g., web page) reloads. The browser 307 may be embodied as the Internet Explorer browser developed by Microsoft Corporation of Redmond, Wash. State). The browser 307 may include the data binding engine 316 which may be embodied as the Java Script Engine developed by Netscape formerly based in Mountain View, Calif. or the ActionScript Engine developed by Adobe of San Jose, Calif. The data binding engine 316 may be utilized to respond to an internal web page interaction with a user (e.g., AJAX function call) that causes an update to the interface 308.

The server machine 306 may include a communication module 317, an interface generation module 318, the data binding engine 316, and couplets of presentation templates 320 and view component information modules 322 that respectively correspond to the dynamic view components 314 on the interface 308. The communication module 317 may receive requests and communicate messages over the network 304. The interface generation module 318 may generate the interface 308 responsive to receiving a request from the client machine 302. In the present example, the interface 308 is illustrated as including an image of a man and a hashed rectangle which represents a hidden coffee cup. The interface generation module 318 may utilize the data binding engine 316, presentation template 320 and the view component information module 322 to include interface elements in a hidden form (e.g., hidden coffee cup) on the interface 308.

The data binding engine 316 was previously described on the client side and substantially operates the same on the server side. One difference is that on the server side, the data binding engine 316 may receive the data in the form of view component information by a local invocation of the view component information module 322 rather than over the network 304.

The presentation template 320 was previously described and is described more fully later in this document.

The view component information module 322 may receive requests for data and communicate the data in the form of view component information either locally to the data binding engine 316 on the server machine 306 or over the network 304 to the data binding engine 316 on the client side. The data may be utilized to generate interface elements.

Figure 4A:
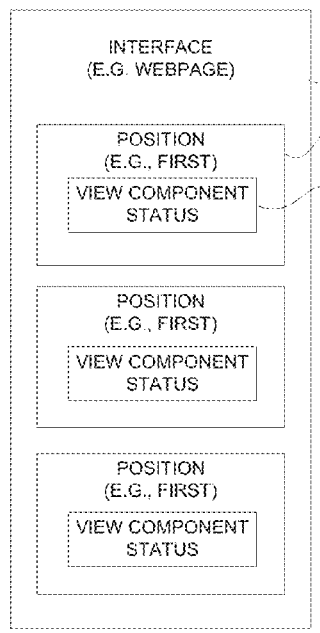
FIG. 4A is a block diagram illustrating an interface, according to an embodiment.

FIG. 4A is a block diagram illustrating an interface 308, according to an embodiment. The interface 308 may be organized according to positions of varying shape that are contiguous or overlapping. Each position may be associated with a view component (e.g., static view component or dynamic view component) that is associated with one or more interface elements and a view component status. The view component status may be configured to "VISIBLE" or "HIDDEN." The "VISIBLE" status may cause a visible rendering of the corresponding interface elements in the associated position on the interface 308, and the hidden status may cause an invisible rendering (e.g., hidden) of the interface elements. Accordingly, a position 400 that is associated with a view component status 402 of "HIDDEN" may include interface elements that are invisible to a user but present to a search engine web crawler for computation of an SEO score.

Figure 4B:
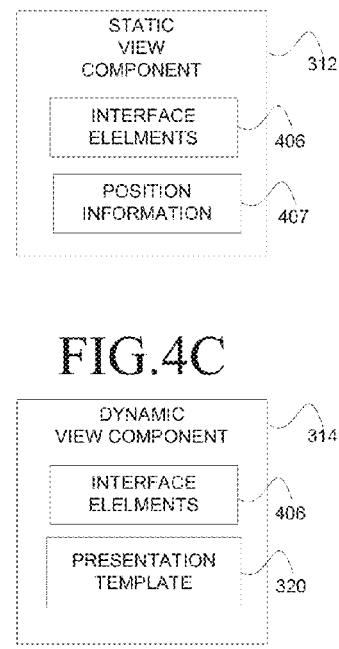
FIG. 4B is a block diagram illustrating a static view component, according to an embodiment.

FIG. 4B is a block diagram illustrating a static view component 312, according to an embodiment. The static view component 312 may include interface elements 406 that are applied to a position 400 (FIG. 4A) on the interface 308 based on position information 407 that identifies a particular position 400 on the interface 308. The static view component 312 is not associated with an internal web page interaction with the user (e.g., an interaction with the user that causes an update to the interface 308 without reloading the interface 308).

Figure 4C:
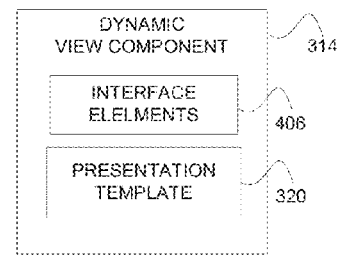
FIG. 4C is a block diagram illustrating a dynamic view component, according to an embodiment.

FIG. 4C is a block diagram illustrating a dynamic view component 314, according to an embodiment. The dynamic view component 314 may include interface elements 406 that are applied to a position 400 on the interface 308. The dynamic view component 314 may further include a presentation template 320. The dynamic view component 314 is associated with an internal web page interaction with the user.

Figure 4D:
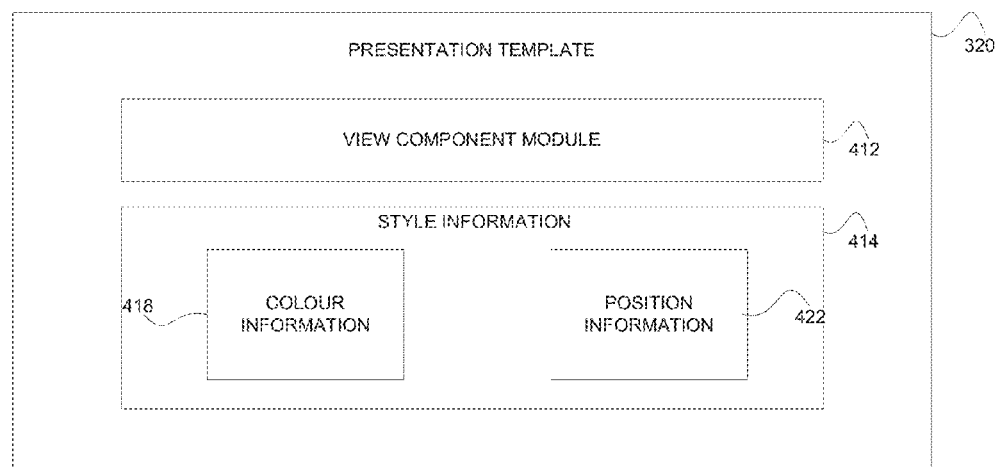
FIG. 4D is a block diagram illustrating a presentation template, according to an embodiment.

FIG. 4D is a block diagram illustrating a presentation template 320, according to an embodiment. The presentation template 320 may include a view component module 412 and style information 414. The view component module 412 is specific to a particular dynamic view component 314 and may be utilized to generate and apply interface elements 406 to the interface 308. The view component module 412 may be loaded into a data binding engine 316 (shown in FIG. 3) and executed locally or remotely to retrieve data from the view component information module 322, generate the interface elements 406 based on the data, apply the interface elements 406 to a position 400 on the interface 308, and display the interface elements 406 on the monitor 310. The style information 414 may also be loaded into the data binding engine 316 (FIG. 3) and utilized by the view component information module 322 to determine the presentation of the interface elements 406. The style information 414 may include style information 414 that determines the style of the interface elements 406 including colour information 418 that determines the colour of the interface elements 406 and position information 407 that identifies the position 400 of the interface elements 406 on the interface 308.

FIG. 5 is a block diagram illustrating a method 500, according to an embodiment, to consistently generate web content. Illustrated on the left are operations that may be performed by the client machine 302 and illustrated on the right are operations that may be performed by the server machine 306.

Request for Interface

The method 500 may commence at operation 502 on the client machine 302 with the browser 307 communicating a request for the interface 308 over the network 304 to the client machine 302.

Figure 6A:
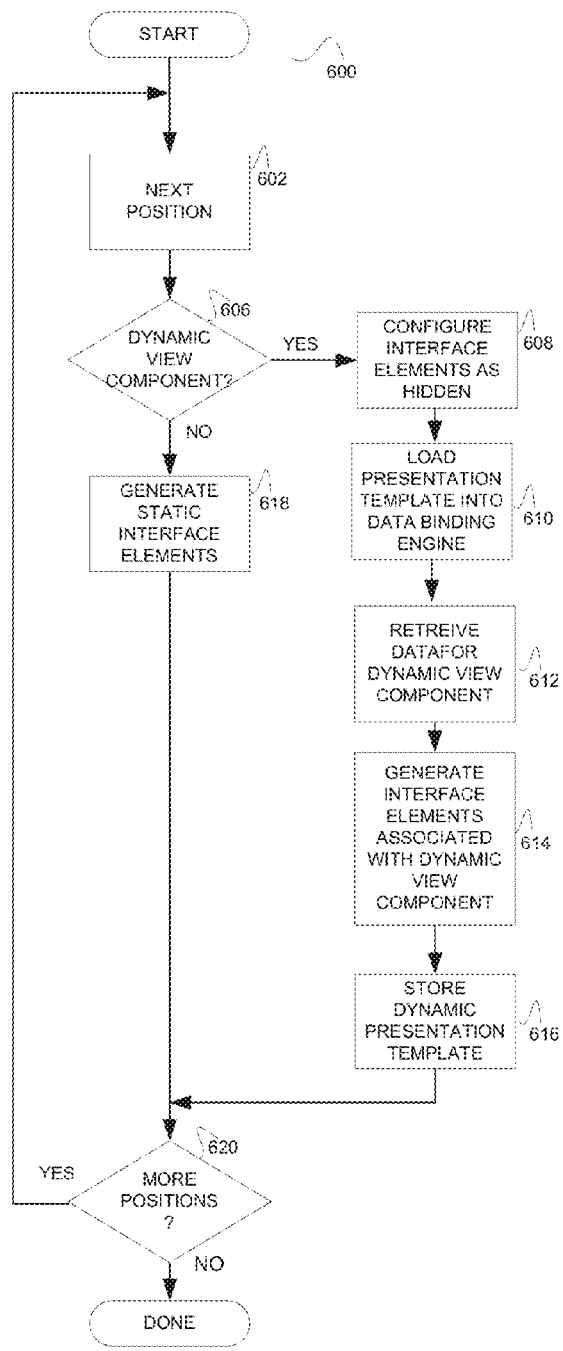
FIG. 6A is a block diagram illustrating a method, according to an embodiment, to generate an interface.

At operation 504, at the server machine 306, the communication module 317 may receive the request, and at operation 506 the interface generation module 318 may generate the interface 308, as described more fully in method 600 of FIG. 6A. At operation 508, the communication module 317 may communicate the interface 308 over the network 304 to the client machine 302.

At operation 510, at the client machine 302, the browser 307 may receive the interface 308. At operations 512, 514, 516, and 518 the browser 307 may generate and display the interface elements 406. It will be appreciated that the interface 308 includes interface elements 406 that correspond to dynamic view components 314 that are hidden and not displayed. The presence of the hidden interface elements 406 on the interface 308 may contribute to an improved SEO score, as previously described in this document.

Request for Update to Interface

At operation 520, at the client machine 302, the browser 307 may receive an internal web page selection from a user that is associated with a particular dynamic view component 314. At operation 522, the browser 307 may identify a presentation template 320 based on the selected dynamic view component 314 and load the presentation template 320 into the data binding engine 316 on the client machine 302. At operation 524, the browser 307 may retrieve the data for the dynamic view component 314 by sending a request (e.g., AJAX request) to the server machine 306. The update may include a dynamic view component identifier that identifies the selected dynamic view component 314.

At operation 526, at the server machine 306, the communication module 317 may receive the request for the update. At operation 528, the communication module 317 may identify the view component information module 322 based on the dynamic view component identifier and invoke the view component information module 322 to generate data in the form of first view component information. At operation 530, the communication module 317 may communicate an update to the client machine 302 that includes the first view component information.

At operation 532, at the client machine 302, the browser 307 may receive the update that includes the data. At operation 534, the browser 307 may generate interface elements 406 associated with the selected dynamic view component 314. For example, the browser 307 may load the data into the data binding engine 316 and invoke the view component module 412 in the data binding engine 316, as further described by method 650 in FIG. 6B.

At operation 536, the browser 307 may display the interface elements 406 associated with the dynamic view component 314 that is identified with the dynamic view component identifier without reloading the interface 308 and the method 500 ends.

FIG. 6A is a block diagram illustrating a method 600, according to an embodiment, to generate an interface 308. The method 600 may be performed on the server machine 306 in response to a request for the interface 308. At operation 602, the interface generation module 318 may advance to the next position 400 on the interface 308. At decision operation 606, the interface generation module 318 may identify whether the current position 400 is associated with a dynamic view component 314. For example, the interface generation module 318 may identify whether the view component (e.g., static view component 312 or dynamic view component 314) includes position information 407 that matches the current position 400. If the interface generation module 318 identifies the current position 400 is associated with a dynamic view component 314, then processing continues at operation 608. Otherwise processing continues at operation 612.

At operation 608, the interface generation module 318 may configure the current position 400 to hide the interface elements 406 from being displayed. For example, the interface generation module 318 may store the value "HIDDEN" in the view component status 402 for the associated position 400 on the interface 308. At operation 610, the interface generation module 318 may load the presentation template 320 that corresponds to the current position 400 into the data binding engine 316 on the server machine 306. At operation 612, the interface generation module 318 may retrieve the data for the dynamic view component 314 that corresponds to the current position 400 by invoking the appropriate view component information module 322 which returns the data. At operation 614, the interface generation module 318 may generate interface elements 406 associated with the dynamic view component 314 associated with the current position 400. For example, the interface generation module 318 may load the data into the data binding engine 316 and invoke the view component module 412 in the data binding engine 316, as further described by method 650 of FIG. 6B. At operation 616, the interface generation module 310 may store the presentation template 320 on the interface 308. Recall that the client machine 302 may utilize the presentation template 320 to perform an internal web page interface with the user (e.g., AJAX remote function call). At operation 618, the interface generation module 318 may generate interface 406 elements for a static view component 312 and apply the interface elements 406 to the interface 308. At decision operation 620, the interface generation module 318 may determine whether more positions 400 are present on the interface 308. If more positions 400 are present on the interface 308, then processing continues at operation 602. Otherwise processing terminates.

Figure 6B:
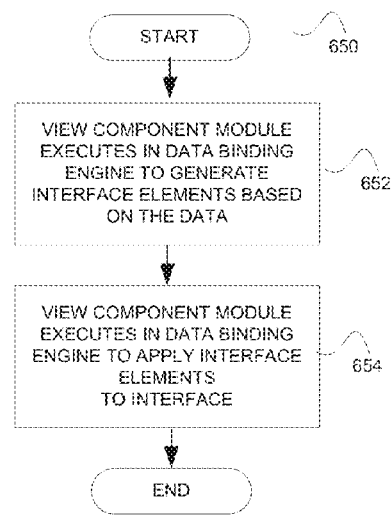
FIG. 6B is a block diagram illustrating a method, according to an embodiment, to generate interface elements associated with a dynamic view component.

FIG. 6B is a block diagram illustrating a method 650, according to an embodiment, to generate interface elements associated with a dynamic view component 314. The method 650 commences at operation 652 with the view component module 412 generating the interface elements 406 based on the data and the style information 414 in the presentation template 320. For example, the view component module 412 may utilize the colour information 418 in the style information 414 to uniformly generate the interface elements 406. At operation 654, the view component module 412 may apply the generated interface elements 406 to the appropriate position on the interface 308 based on the position information 422 in the presentation template 320 and the method 650 ends.

The interface 308 was described in embodiments that include a user interface that may include dynamic view components 314 and static view components 312; however, it will be appreciated by those skilled in the art that the interface 308 may also be embodied as a machine interface (e.g., SGML) including machine view components, an audio interface including audio view components, a kinetic interface including kinetic view components, or some other interface.

Figure 7:
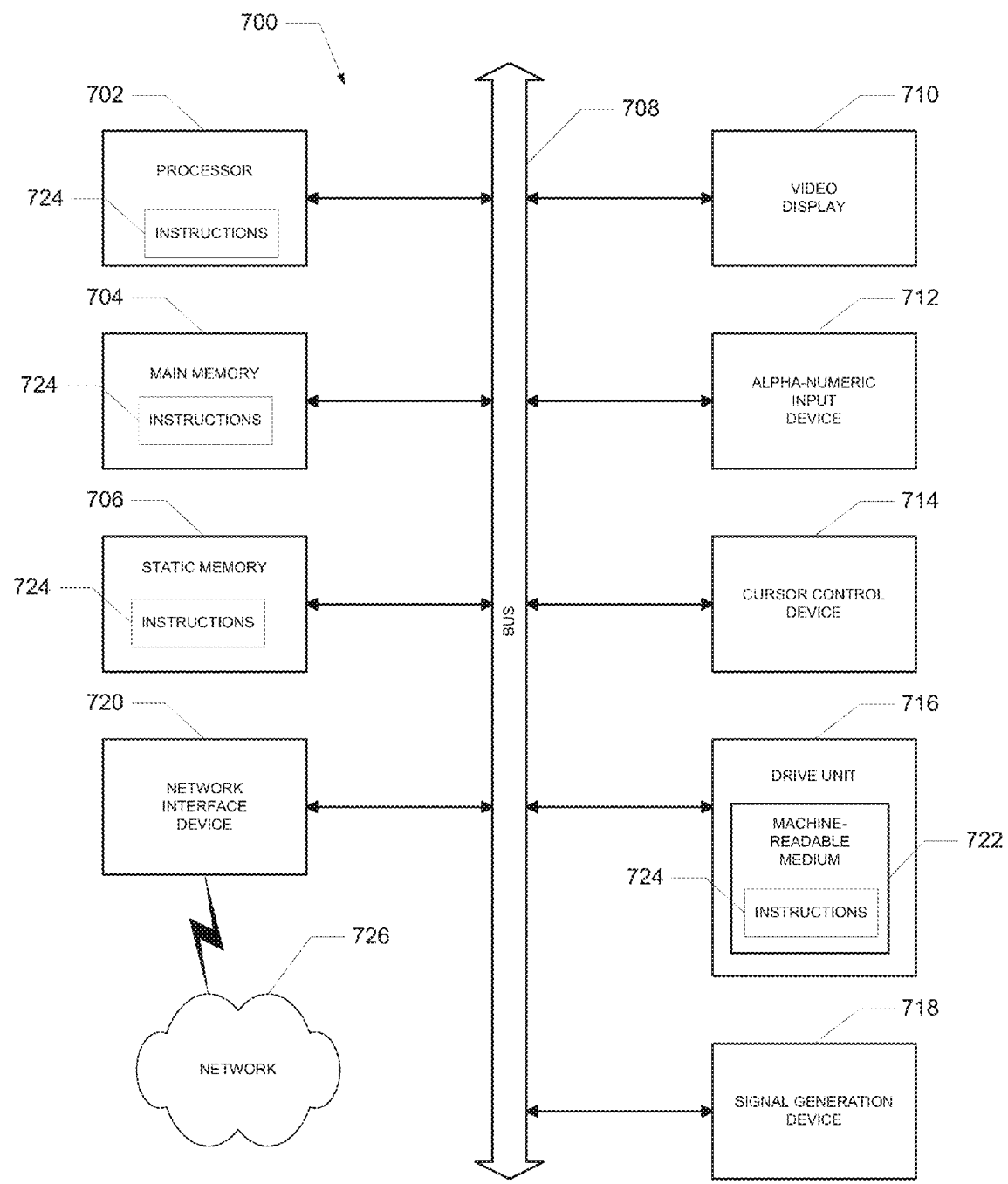
FIG. 7 shows a diagrammatic representation of a machine in the form of a computer system within which may be executed a set of instructions for causing the machine to perform any one or more of the methodologies discussed herein, according to an example embodiment.

FIG. 7 shows a diagrammatic representation of a machine in the example form of a computer system 700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions 724 (e.g., software) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system 700 is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to consistently generate web content are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a request, over a network at a server machine, for an interface, from a client machine, the receiving done in part through the use of one or more processors;
generating the interface at the server machine, the generating including generating a plurality of view components on the interface including a first view component, the generating of the first view component on the interface including utilizing a data binding engine executing on the server machine to apply at least one interface element to a first position on the interface based on a presentation template and first view component information, the interface including a status that is associated with the first position on the interface, the at least one interface element being hidden from display, at the client machine, based on the status that is associated with the first position, the generating done in part through the use of one or more processors;
communicating the interface, over the network, to the client machine;
receiving a request from the client machine, the request being for updating the first position on the interface; and
communicating an update to the client machine, the update including the first view component information, the updating of the first view component on the interface including utilizing a data binding engine that executes on the client machine to apply the at least one interface element to the first position on the interface based on the presentation template and the first view component information, the at least one interface element being visibly displayed, at the client machine, based on the status that is associated with the first position being reconfigured to cause the visible display of the at least one interface element, the data binding engine that executes on the server machine and the data binding engine that executes on the client machine executing same software to apply at least one interface element to the first position on the interface based on the presentation template and the first view component information.

2. The method of claim 1, wherein the generating the interface at the server machine includes generating the interface to include the presentation template.

3. The method of claim 1, wherein the presentation template includes style information and a view component module.

4. The method of claim 2, wherein the generating of the first view component at the server machine includes loading the data binding engine with the presentation template.

5. The method of claim 3, wherein the generating of the first view component at the server machine includes utilizing the data binding engine to execute the view component module.

6. The method of claim 1, wherein the generating of the first view component at the server machine includes loading the data binding engine with the first view component information.

7. The method of claim 1, wherein the generating of the first view component at the server machine includes utilizing the data binding engine to utilize style information to apply the first view component information to the first position on the interface.

8. The method of claim 1, wherein the data binding engine that executes at the server is a JavaServer Pages data binding engine and wherein the data binding engine that executes at the client machine is a JavaServer Pages data binding engine.

9. The method of claim 1, wherein the receiving of the request includes receiving an asynchronous JavaScript and XML (AJAX) request.

10. A system comprising:
 a processor and instructions accessible on a computer readable medium that, when executed, cause the processor to perform the operations comprising;
 receiving a request, over a network at a server machine, for an interface, from a client machine, the receiving done in part through the use of one or more processors;
 generating the interface at the server machine, the generating including generating a plurality of view components on the interface including a first view component, the generating of the first view component on the interface including utilizing a data binding engine executing on the server machine to apply at least one interface element to a first position on the interface based on a presentation template and first view component information, the interface including a status that is associated with the first position on the interface, the at least one interface element being hidden from display, at the client machine, based on the status that is associated with the first position, the generating done in part through the use of one or more processors;
 communicating the interface, over the network, to the client machine;
 receiving a request from the client machine, the request being for updating the first position on the interface; and
 communicating an update to the client machine, the update including the first view component information, the updating of the first view component on the interface including utilizing a data binding engine that executes on the client machine to apply the at least one interface element to the first position on the interface based on the presentation template and the first view component information, the at least one interface element being visibly displayed, at the client machine, based on the status that is associated with the first position being reconfigured to cause the visible display of the at least one interface element, the data binding engine that executes on the server machine and the data binding engine that executes on the client machine executing same software to apply at least one interface element to the first position on the interface based on the presentation template and the first view component information.

11. The system of claim 10, wherein the interface includes the presentation template.

12. The system of claim 10, wherein the presentation template includes style information and a view component module.

13. The system of claim 11, wherein the operations are further comprising loading the presentation template.

14. The system of claim 12, wherein the the operations are further comprising executing the view component module.

15. The system of claim 10, wherein the operations are further comprising loading the first view component information.

16. The system of claim 10, wherein the operations are further comprising utilizing style information to apply the first view component information to the first position on the interface.

17. The system of claim 10, wherein the operations are further comprising:
 executing, at the server, a JavaServer Pages data binding engine; and
 executing, at the client machine, a JavaServer Pages data binding engine.

18. The system of claim 10, wherein the operations are further comprising receiving an asynchronous JavaScript and XML (AJAX) request.

19. A machine-readable medium having no transitory signals and storing instructions that, when executed by a machine, cause the machine to perform actions comprising:
 receiving a request, over a network at a server machine, for an interface, from a client machine;
 generating the interface at the server machine, the generating including generating a plurality of view components on the interface including a first view component, the generating of the first view component on the interface including utilizing a data binding engine executing on the server machine to apply at least one interface element to a first position on the interface based on a presentation template and first view component information, the interface including a status associated with the first position on the interface, the at least one interface element being hidden from display, at the client machine, based on the status that is associated with the first position;
 communicating the interface, over the network, to the client machine;
 receiving a request from the client machine, the request being for updating the first position on the interface; and
 communicating an update to the client machine, the update including the first view component information, the updating of the first view component on the interface including utilizing a data binding engine that executes on the client machine to apply the at least one interface element to the first position on the interface based on the presentation template and the first view component information, the at least one interface element being visibly displayed, at the client machine, based on the status that is associated with the first position being reconfigured to cause the visible display of the at least one interface element, the data binding engine that executes on the server machine and the data binding engine that executes on the client machine executing same software to apply at least one interface element to the first position on the interface based on the presentation template and the first view component information.

20. A system comprising:
a first means for receiving a request, over a network at a server machine, for an interface, from a client machine;
a processor; and
instructions accessible on a computer-readable medium that, when executed, cause the processor to perform actions comprising:
receiving a request, over a network at a server machine, for an interface, from a client machine, the receiving done in part through the use of one or more processors;
generating the interface at the server machine, the generating including generating a plurality of view components on the interface including a first view component, the generating of the first view component on the interface including utilizing a data binding engine executing on the server machine to apply at least one interface element to a first position on the interface based on a presentation template and first view component information, the interface including a status that is associated with the first position on the interface, the at least one interface element being hidden from display, at the client machine, based on the status that is associated with the first position, the generating done in part through the use of one or more processors;
communicating the interface, over the network, to the client machine;
receiving a request from the client machine, the request being for updating the first position on the interface; and
communicating an update to the client machine, the update including the first view component information, the updating of the first view component on the interface including utilizing a data binding engine that executes on the client machine to apply the at least one interface element to the first position on the interface based on the presentation template and the first view component information, the at least one interface element being visibly displayed, at the client machine, based on the status that is associated with the first position being reconfigured to cause the visible display of the at least one interface element, the data binding engine that executes on the server machine and the data binding engine that executes on the client machine executing same software to apply at least one interface element to the first position on the interface based on the presentation template and the first view component information.

* * * * *